(12) United States Patent
Gueugneaud

(10) Patent No.: US 7,237,787 B2
(45) Date of Patent: Jul. 3, 2007

(54) ASSEMBLY COMPRISING A BICYCLE FORK AND A HEADSET ON A BICYCLE FRAME AND FORK FOR ONE SUCH ASSEMBLY

(75) Inventor: Jean-Marc Gueugneaud, St. Clair de la Tour (FR)

(73) Assignee: Time Sport International, Varennes Vauelles (FR)

( * ) Notice: Subject to any disclaimer, the term of this patent is extended or adjusted under 35 U.S.C. 154(b) by 12 days.

(21) Appl. No.: 10/538,324

(22) PCT Filed: Dec. 5, 2003

(86) PCT No.: PCT/FR03/03607

§ 371 (c)(1),
(2), (4) Date: Jun. 10, 2005

(87) PCT Pub. No.: WO2004/062995

PCT Pub. Date: Jul. 29, 2004

(65) Prior Publication Data

US 2006/0107783 A1    May 25, 2006

(30) Foreign Application Priority Data

Dec. 12, 2002 (FR) .................................. 02 15694

(51) Int. Cl.
*B62M 15/00* (2006.01)
*B62M 13/00* (2006.01)
(52) U.S. Cl. ....................................... 280/279; 280/276
(58) Field of Classification Search ................ 280/279, 280/276, 288.4; 403/104, 7, 297
See application file for complete search history.

(56) References Cited

U.S. PATENT DOCUMENTS 3,660,995 A * 5/1972 Klein, Jr. ..................... 70/187

(Continued)

FOREIGN PATENT DOCUMENTS

EP    0690241    1/1996
FR    2384668    10/1978

OTHER PUBLICATIONS

International Search Report No. PCT/FR03/003607, dated May 11, 2004, 2 pages.

*Primary Examiner*—Hau Phan
(74) *Attorney, Agent, or Firm*—Connolly Bove Lodge & Hutz LLP

(57) ABSTRACT

The invention relates to an assembly comprising a bicycle fork (1) and a headset (J) on a steering column (2) of a bicycle frame. According to the invention, the fork is solidly connected to a pivot (3) which extends (3a) beyond the end of the steering column, opposite that comprising the fork, such that a handlebar stem can be fixed thereto using the external screw thread of the pivot. The aforementioned headset (J) comprises a lower bearing (7) and an upper bearing (8) and an adjustment means (M) is provided for the axial clamping of said headset. Moreover, in the area at the end of the steering column opposite that comprising the fork, the outer surface of the pivot (3) contains a zone (B) which is equipped with first connecting means (13), while the above-mentioned pivot extension (3a), which is disposed at the end opposite that comprising the fork (1), has no such connecting means. The invention further comprises a bushing (15) which is equipped with second connecting means (16), complementary to those of the pivot, and which is used to adjust the axial clamping of the headset.

6 Claims, 2 Drawing Sheets

U.S. PATENT DOCUMENTS

| | | | |
|---|---|---|---|
| 3,785,676 A * | 1/1974 | Klein, Jr. | 280/279 |
| 3,787,126 A * | 1/1974 | Arlen | 403/104 |
| 4,068,858 A * | 1/1978 | Harrison et al. | 280/288.4 |
| 4,310,260 A * | 1/1982 | Katayama | 403/7 |
| 4,466,629 A * | 8/1984 | Sinyard | 280/279 |
| 5,197,349 A * | 3/1993 | Herman | 403/297 |
| 5,291,797 A | 3/1994 | Chi | |
| 5,509,676 A * | 4/1996 | Fukutake et al. | 280/276 |
| 5,911,428 A * | 6/1999 | Ueda et al. | 280/276 |

* cited by examiner

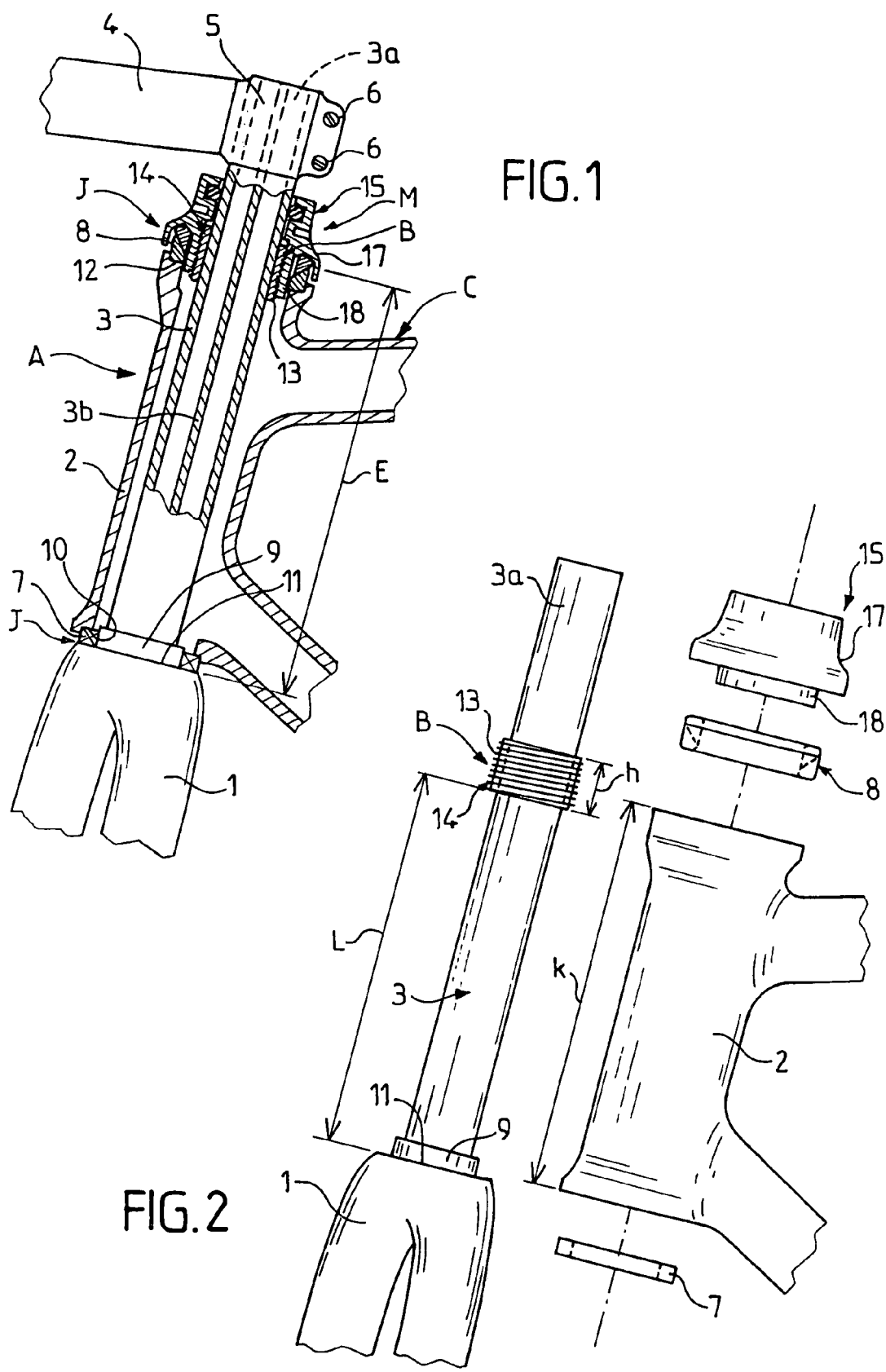

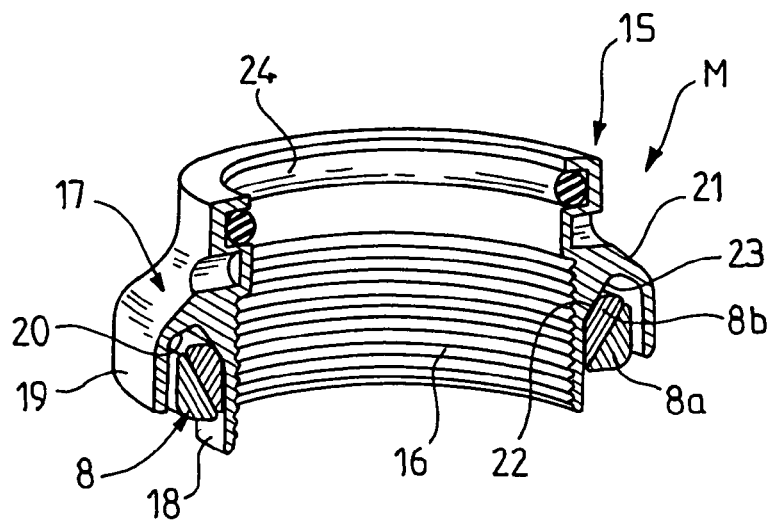
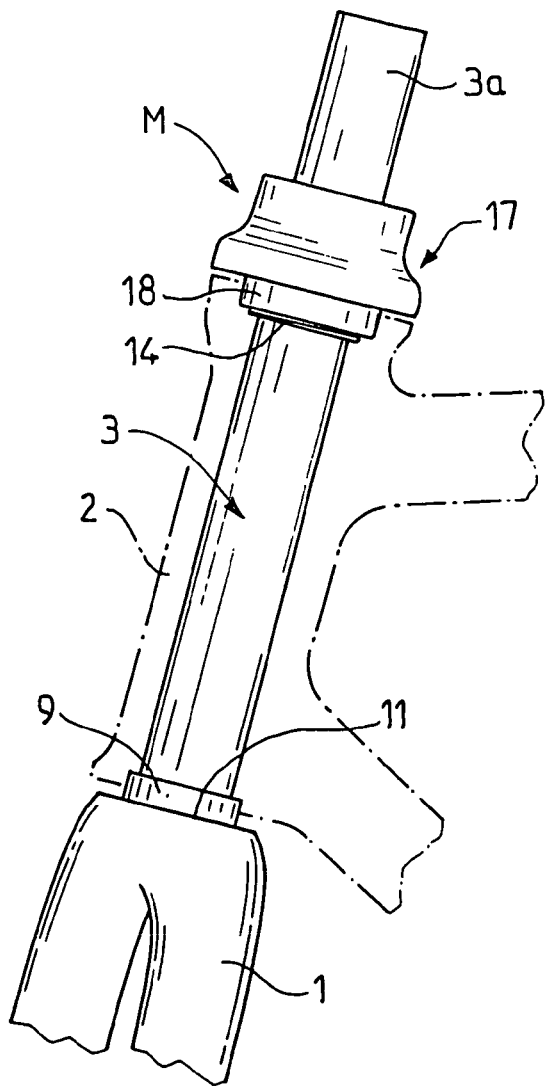

ASSEMBLY COMPRISING A BICYCLE FORK AND A HEADSET ON A BICYCLE FRAME AND FORK FOR ONE SUCH ASSEMBLY

The invention relates to an assembly of a bicycle fork and of a steering headset on a steering column of a bicycle frame, the fork being secured to a pivot which is extended beyond the end of the steering column furthest from the fork to allow the attachment of a handlebar by externally clamping the pivot, the steering headset comprising a lower bearing and an upper bearing which are arranged between the pivot and the column, while an adjusting means for adjusting the axial clamping of the steering headset is provided.

An assembly of this kind, known as a "headset" is based on the principle of holding the bearing/fork assembly together by immobilizing the handlebar on the fork pivot. An example is disclosed in FR 2 815 928 in the name of the same Applicant Company.

This principle has advantages in terms of the rigidity of the connection, the lightness of weight, the use of new materials, particularly composites, by comparison with the solution which consisted in introducing a handlebar stem inside the pivot and in immobilizing the stem in the pivot using an expansion device. However, these assemblies are awkward to achieve, particularly as far as adjusting the steering headset is concerned.

Specifically, in known assemblies of the headset type, in order to adjust the axial clamping of the steering headset, use is made of an axial thrust from a sleeve secured to the handlebar. Now, the position of the handlebar and of its sleeve, in the axial direction of the pivot, depends on the cyclist's build and desires; this position cannot therefore be pre-set at the factory without the cyclist who is going to use the bicycle being present. It is therefore down to the specialist retailer to set it up to suit the user. The retailer has therefore to adjust the clamping of the steering headset, having assembled the components and fitted the handlebar.

This relatively awkward operation is often very temporary because the user may wish to alter his position on the bicycle and change the handlebar settings. Each action on the handlebar has the effect of altering the settings of the steering headset in known assemblies, which means that the steering headset has to be readjusted.

It is an object of the invention, above all, to provide an assembly of the aforementioned kind in which the steering headset can be set at the factory independently of the position of the handlebar, so that the retailer does not have to work on the steering headset when setting up the bicycle. Furthermore, it is desirable for the cyclist who is going to use the bicycle to be able to adjust the handlebar without altering the settings of the steering headset.

According to the invention, an assembly of a bicycle fork and a steering headset on a steering column of a bicycle frame, of the kind defined hereinabove, is characterized in that:

the pivot comprises, in the region of the end of the steering column furthest from the fork, on its exterior surface, a zone equipped with first connecting means, the extension of the pivot on the opposite side to the fork having no such connecting means, and a bushing equipped with second connecting means, complementing those of the pivot, is provided to allow the axial clamping of the steering headset to be adjusted by collaboration with the first connecting means.

As a preference, the zone of the pivot equipped with first connecting means consists of a ring of determined length slipped around the pivot and fixed to the latter. The ring may have an external screw thread comprising the first connecting means.

The second connecting means may be formed by an internal screw thread provided on the bushing and the conjugate of that of the ring.

The ring may be fixed to the pivot by bonding. The pivot may be made of composite and the attached ring may be made of metal.

The bushing is advantageously formed of a steering cup. A rotation-proofing brake may be provided between the bushing and the pivot. This brake may consist of an O-ring.

The length of the threaded ring may be about 1 cm.

As an alternative, the axial length of the threaded ring, or more generally of the zone equipped with the first connecting means, is sufficient to allow the steering headset to be clamped and adjusted with different heights of steering column.

The invention also relates to a fork for such an assembly, this fork being secured to a pivot which is extended to allow a handlebar to be attached by external clamping of the pivot, and characterized in that the pivot comprises, in a region furthest from the fork, on its exterior surface, a zone equipped with first connecting means, the extension of the pivot on the opposite side to the fork having no such connecting means. The zone of the pivot equipped with the first connecting means advantageously consists of a ring of determined length slipped around the pivot and fixed to the latter.

Apart from the provisions set out hereinabove, the invention consists in a certain number of other provisions which will be dealt with more explicitly hereinbelow with regard to an exemplary embodiment described in detail with reference to the attached drawings, but which is not in any way limiting.

In these drawings:

FIG. 1 is a perspective view with partial cutaway of a fork-steering headset assembly on a bicycle frame according to the invention;

FIG. 2 is an exploded perspective view of the parts of the assembly of FIG. 1, FIG. 3 is a vertical section in perspective on a larger scale of the steering cup, and FIG. 4 shows, in perspective, the fork and the pivot both equipped with the steering cup.

Reference is made to FIG. 1 which shows an assembly A of a bicycle fork 1 and of a steering headset J on a steering column 2 of a bicycle frame C.

The fork 1 is secured to a pivot 3 which is extended at 3a beyond the end of the column 2 furthest from the fork 1, that is to say beyond the upper end of the column 2 in the case of a bicycle in the running position. The part 3a of the pivot 3 allows the attachment of a handlebar 4, depicted schematically and partially, which comprises at the rear a sleeve 5 surrounding the pivot 3. The pivot 3 is cylindrical, generally of circular cross section, preferably with a diameter that is constant in the axial direction, at least in the handlebar attachment zone. The sleeve 5 is generally split at the rear along a generatrix and comprises clamping means, particularly screws 6, to allow the handlebar to be immobilized on the pivot 3 by external clamping of the pivot 3. The pivot may comprise one or more internal stiffening partitions 3b.

The steering headset J comprises a lower bearing 7 and an upper bearing 8 both arranged between the pivot 3 and the column 2, and an adjusting means M for adjusting the axial clamping of the steering headset J.

The lower bearing 7 is internally centered on a bearing surface 9 of the pivot and is arranged axially between seat 10 machined at the base of the steering column and a shoulder 11 of the fork 1. The upper bearing 8 is arranged between a seat 12 provided at the upper end of the column 2 and the means M for axially clamping the steering headset J.

The axial clamping of the steering headset J, and more precisely of the bearings 7 and 8, is adjusted by altering the dimension E which corresponds to the distance between the shoulder 11 and the bearing surface via which the means M bears against the upper bearing 8.

In the hitherto known devices, the axial clamping of the headset J is obtained by bearing, if necessary with the interposition of shims, against the lower part of the sleeve 5 when the handlebar has been adjusted. A change in the position of the sleeve 5 therefore alters the axial clamping of the steering headset J.

According to the invention, the pivot 3 comprises, in the region of the end of the column 2 furthest from the fork 1, on its exterior surface, a zone B equipped with first connecting means advantageously consisting of a screw thread 13.

As a preference, the zone B consists of a ring 14 the exterior surface of which is equipped with the screw thread 13 and the cylindrical interior surface of which is smooth. The inside diameter of the ring 14 is equal to the outside diameter of the pivot 3. The ring 14 is slipped around the pivot 3 and fixed to the latter, particularly by bonding.

The axial length h of the ring 14 may be about 1 cm, which is enough to adjust the clamping to correspond to a determined height of column 2. However, a greater length h may be anticipated and this would allow axial adjustment with steering columns 2 of different heights corresponding to frames C of different sizes.

The extension 3a of the pivot on the opposite side to the fork 1 comprises a plain exterior surface with no screw thread.

The pivot 3 may be made of a composite based on carbon fiber resin, while the ring 14 is made of metal. Of course, the pivot 3 may also be made of metal, particularly steel, or of aluminum or of titanium.

A bushing 15, equipped with second connecting means, advantageously consisting of a screw thread 16 that is the conjugate of the screw thread 13 of the pivot is provided to allow the axial clamping of the steering headset J to be adjusted by turning the bushing 15 relative to the pivot 3.

The bushing 15 consists of a steering cup 17, clearly visible in FIG. 3, comprising a sleeve 18 with the internal screw thread 16 and a skirt 18 separated radially from the sleeve 18 and determining an annular housing 20 for the bearing 8. The skirt 19 is connected to the upper part of the cup 17 by a frustoconical wall 21.

The bearing 8 comprises a lower ring 8a resting against the seat 12 and an upper ring 8b having, radially toward the inside, a frustoconical surface 22 widening towards the top, coming to rest against a frustoconical shoulder 23 provided on the sleeve 18. Rolling elements, for example balls, not visible, are provided between the rings 8a and 8b.

The upper part of the cup 17 forms a collar which, on the inside, has an annular groove in which an elastomer O-ring 24, designed to rub internally against the surface of the pivot 3 and to slow the rotation of the cup 17 relative to the pivot 3 is housed. This example of a rotation-braking means is non-limiting, it being possible for other known means to be envisaged.

That being the case, the assembly A is produced then the axial clamping of the steering headset is adjusted, as follows.

The threaded ring 14 is fixed, preferably by bonding, at a distance L from the shoulder 11 of the top of the fork which depends on the size of the frame and, more precisely, on the height k of the column 2.

The lower bearing 7 is fitted around the pivot 3 and slid along, past the ring 14 until it comes to rest against the shoulder 11. If the outside diameter of the ring 14 is greater than the inside diameter of the bearing 9, the latter would be placed on the shoulder 11 before the ring 14 was bonded in place.

The pivot 3 is then engaged inside the column 2 until the bearing 9 positions itself in the lower seat 10 of the column 2. The ring 14 is then in the upper end region of the column 2, generally just above this end, and the part 3a of the pivot protrudes from the upper edge of the column 2.

The upper bearing 8 is fitted around the pivot 3 and placed on the upper seat 12 of the column 2.

The steering cup 17 is then fitted around the pivot 3 and slid down to the level of the ring 14. The cup 17 is turned to cause its interior screw thread 16 to collaborate with the screw thread 13 of the ring 14. The bearing 8 engaged in the housing 20 of the cup 17 comes to rest, via its upper ring, against the shoulder 23.

Finally, the steering headset J is clamped to a predetermined torque. The frame-fork assembly is complete, with the clamping of the steering headset adjusted.

The frame-fork assembly can then be delivered to a specialist retailer who will mount the handlebar 4 on the pivot 3 and adjust the handlebar to suit the build of the cyclist. When the handlebar 4 has been fixed in the appropriate position, the part of the pivot 3 situated above the handlebar will be eliminated by cutting the pivot off just above the handlebar 4.

The adjustment of the handlebar is dissociated from the adjusting of the steering headset. This results in a considerable simplification of the work to be done by the specialist retailer and better control of the quality of the steering since it is assembled and adjusted at the factory.

The long-term stability of the adjustments made is improved.

To house the ring 14 without modifying the surrounding components all that is required is the provision of a compact bearing 8 freeing up enough space to house the ring 14. It would, however, be possible to use a larger bearing 8 if the surrounding components were modified.

Although a screw thread is a simple and economical solution for producing the conjugate connecting means 13 and 16, other equivalent solutions such as a helical ramp and a radial peg collaborating with the ramp may be envisaged.

The invention claimed is:

1. An assembly comprising:
   a bicycle fork and a steering headset on a steering column of a bicycle frame;
   a pivot to which said fork is secured, wherein said pivot is extended beyond an end of the steering column furthest from the fork to allow the attachment of a handlebar by externally clamping the pivot, and wherein said steering headset comprises a lower bearing and an upper bearing which are arranged between said pivot and said steering column;
   a zone on an exterior surface of said pivot in a region of said end of the steering column furthest from the fork, wherein said zone includes first connecting means, and wherein said first connecting means comprises a ring slipped around the pivot and fixed to the pivot by bonding, a pivot extension extending from said zone in a direction away from said fork, wherein said pivot extension has no such first connecting means; and a bushing equipped with second connecting means complementing the first connecting means, wherein said bushing allows axial clamping of the steering headset to be adjusted by collaboration with the first connecting means.

2. The assembly as claimed in claim 1, wherein the ring has an external screw thread.

3. The assembly as claimed in claim 2, wherein second connecting means are formed by an internal screw thread provided on the bushing and the conjugate of that of the ring.

4. The assembly as claimed in claim 1, wherein the pivot is made of composite and the ring is made of metal.

5. The assembly as claimed in claim 1, wherein the bushing is formed of a steering cup.

6. The assembly as claimed in claim 1, wherein a rotation-proofing brake is provided between the bushing and the pivot.

* * * * *